May 25, 1937.　　　　　F. WINKLER　　　　　2,081,566
FREEWHEEL COASTER HUB
Filed Feb. 3, 1936　　　2 Sheets—Sheet 1
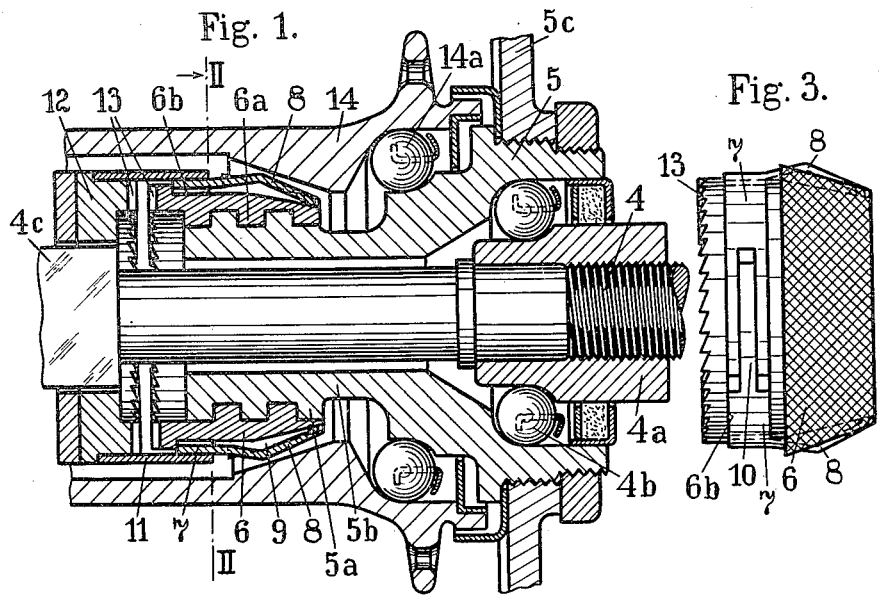
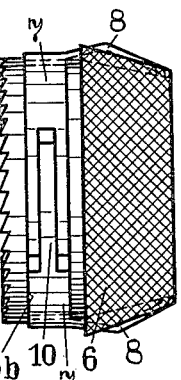
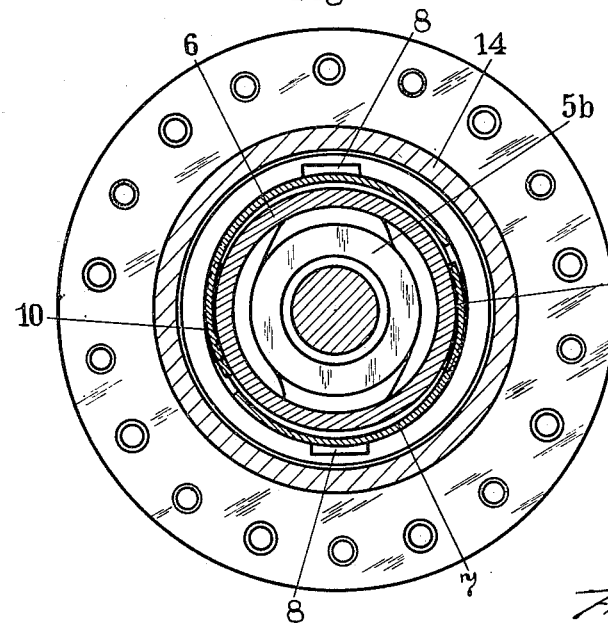
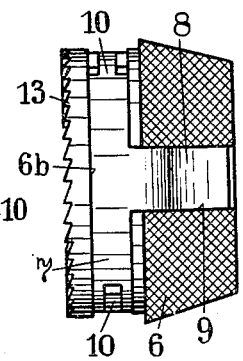
Inventor
Franz Winkler

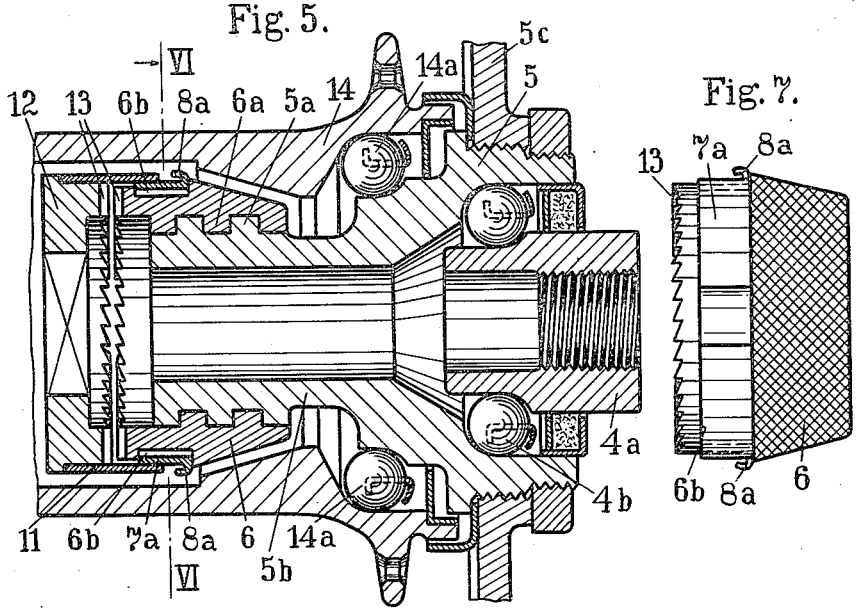
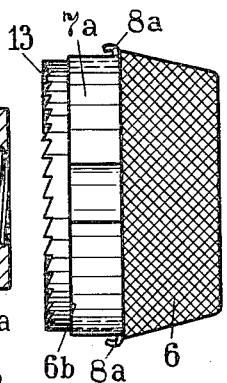
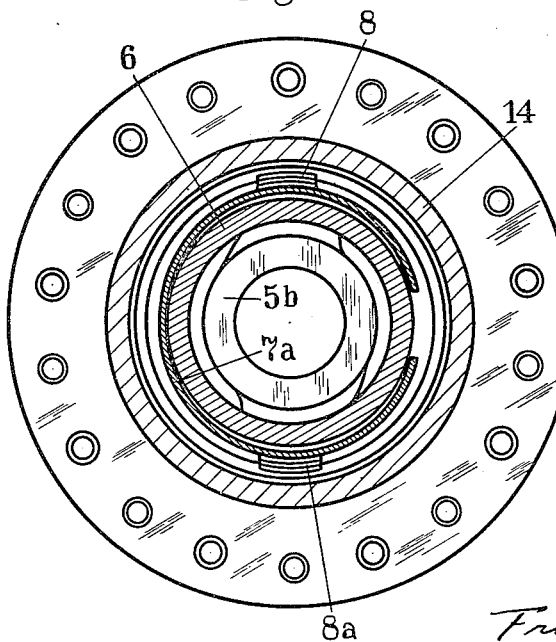
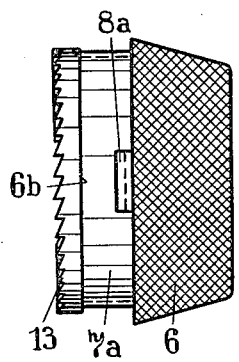

Patented May 25, 1937

2,081,566

UNITED STATES PATENT OFFICE 2,081,566

FREEWHEEL COASTER HUB

Franz Winkler, Wurzburg, Germany

Application February 3, 1936, Serial No. 62,052
In Germany February 11, 1935

4 Claims. (Cl. 192—6)

The invention relates to free-wheel coaster-hubs, and more particularly to a control device for the clutches of bicycle hubs of this kind by which undue friction is avoided during driving and free wheeling while its frictional influence is rendered effective when the back-pedalling brake is to be applied.

According to the invention, the object of the frictional checking device, intended to control a coupling sleeve screwable on the driver of the free-wheel hub, is to so construct the spring members devised to slide on a non-revoluble part that the coupling sleeve is effectively secured in its respective positions in which it is adjusted according to the different scopes.

To attain this object, a spring or resilient ring is mounted on the periphery of the coupling sleeve immovably in axial relation but radially expansible, which ring is in frictional contact with the inner face of a non-rotatable cylindrical body during free-wheeling and braking, while projections of the ring bear against the interior conical face of the hub sleeve on driving the bicycle, when the spring ring is compressed or reduced to a smaller diameter, thereby retreating from the counter friction face so that no frictional resistance consumes part of the drive.

In the drawings, which form a part of this specification, two embodiments of the invention are represented by way of example. In the drawings—

Fig. 1 is a longitudinal sectional view of a free-wheel hub and the clutch-controlling device according to the first embodiment, Fig. 2 is a cross section on the line II—II of Fig. 1, Figs. 3 and 4 represent side elevations of a coupling sleeve and the controlling spring device seen in a radial direction turned through 90 degrees.

Figs. 5 and 6 are an axial section and a cross section, on the line VI—VI of Fig. 1, of the second embodiment of the invention, and Figs. 7 and 8 illustrate side elevations of the coupling sleeve and the controlling spring device like Figs. 3 and 4.

Like numerals designate like or similar parts throughout all figures of the drawings.

Referring first to the construction represented in Figs. 1 to 4, the free-wheel hub comprises an axle 4 with a bearing cone 4a screwed thereon, a driver 5 supported on balls 4b and having screw threads 5a on its sleeve-like projection 5b, a power transmitting element, such as a sprocket wheel 5c fixed on the driver, and a hub shell 14 supported on the driver by means of balls 14a. On the screw threads 5a by means of corresponding female screw threads 6a, a partially conical coupling sleeve 6 is displaced to and fro when the driver is rotated in the one direction or in the other. This transformation of movement is generated under the assistance of a checking or retarding device permitting frictionless operation in certain working phases of the free-wheel hub.

In a peripheral groove 6b of the cylindric portion of the coupling sleeve 6 there is seated a springy extensible and contractible ring 7 comprising two halves each of which is provided with any suitable number of lateral springy tongues 8 bent angularly and guided in one of the longitudinal slots 9 diametrically oppositely recessed in the criss-cross grooved conical circumference of the sleeve 6, either tongue being so shaped that ordinarily the apex of its bend projects from the circumference of the conical portion of the sleeve 6, while their free ends press onto the sleeve, thereby tending to move the two halves apart. The two halves of the ring 7 overlap each other at their ends by means of slit and tongue 10 and preferably they are slightly out of round so that, when not subject to external pressure, their central portions tend to slightly extend beyond the circumference of the cylindric portion of the said threaded sleeve 6. In this position they contact against the internal surface of a ring 11 immovably mounted on the periphery of a pressure ring 12 non-rotatably placed on a square flange 4c of a stationary member, for example of the axle 4 and adapted to act upon the brake of well known construction, for example a disc brake not shown. The opposite ends of the ring 12 and the sleeve 6 bear coupling teeth 13 to provide for non-rotatably securing of the sleeve 6 when shifted towards the ring 12.

The springy ring 7 may also comprise one piece only and be slightly oval in shape, similarly as shown in Fig. 6, so that it presses the tongues 8 outwards within the slots 9.

The free-wheel hub works as follows: When pedalling forwards the coupling sleeve 6 is screwed along on the driver 5 towards the sprocket wheel 5c in order that its conical portion is brought into engagement with the tapered bore of the hub shell 14. This has the effect to press the projecting portion of the tongues 8 into the grooves or slots 9, when the halves of the ring 7, from which they project, are compressed and caused to enter the peripheral groove away from the ring 11, which results in a friction between the rotating parts and the stationary parts being done away with. When the pedals are held idly the sleeve 6 is screwed back on the driver 5 by the hub shell 14 which continues running, so that the conical driving clutch is disengaged and the springy parts 7 allowed to project again. As now the sleeve 6 has been detached from the tapered bore of the hub shell 14 and the tongues 8 will no more bear against the said tapered bore, the ring 7 will again contact against the interior face of the ring 11. The sleeve 6 is thus held in its position and free-wheel movement not subject to friction will result thereof. When back-pedalling takes place the sleeve will be screwed along towards the ring 12, until the serrated clutch 13 has been closed, and the brake of any suitable design connected with the ring 12 rendered operative.

The embodiment shown by Figs. 5 to 8 substantially corresponds to that of Figs. 1 to 4, except that the tongues are replaced by short lugs 8a bent off the ring 7a. When the driving clutch is rendered operative these lugs are caused to bear against the tapered bore of the hub shell 14 so that the ring 7a is compressed and withdrawn from the ring 11. These lugs are comparatively stiff and will safely compress the ring 7a.

The checking device of limited length has the advantage over known appliances for the same purpose in that it is simple in construction and manufacture, effective in operation and not subject to waste and fracture, while the required effect is readily obtained.

I claim:

1. In a free-wheel coaster hub, the combination with a hub shell, of a driver, a coupling sleeve screwable thereon, a conical clutch face on the hub shell, said coupling sleeve being the driving clutch for said hub shell, an immovable member located in the hub shell and a check device mounted on the coupling sleeve and comprising a resilient ring seated in a peripheral groove of the coupling sleeve interiorly of the immovable member and inherently expansible into engagement with said latter member, and projections adapted to be pressed against the hub shell, thereby compressing the resilient ring and detaching it from the immovable member.

2. With a free-wheel hub, composed of a wheel axle, a hub shell having an inner conical clutch face, a driver, a conical coupling sleeve screwable thereon and engageable with said clutch face for driving said hub shell, and a ring member non-rotatably mounted on the axle, a check device, comprising a resilient ring located in a peripheral groove of the coupling sleeve interiorly of, and inherently expansible into contact with, the non-rotatable ring member, and angularly bent tongues axially projecting from said resilient ring into axial recesses of the coupling sleeve and partially rising above the periphery thereof, said tongues being adapted to compress said resilient ring, when the driving coupling is engaged.

3. With a free-wheel hub, composed of a wheel axle, a hub shell having an inner conical clutch face, a driver, a conical coupling sleeve screwable thereon, and a ring member non-rotatably mounted on the axle, a check device, comprising a resilient ring located in a peripheral groove of the coupling sleeve interiorly of, and in contact with, the non-rotatable ring member, and lugs radially projecting from said resilient ring, said lugs being adapted to engage the conical clutch face of the hub shell in the drive and to compress the resilient ring and remove it from the ring member.

4. With a free-wheel hub, composed of a hub shell having an inner conical coupling face, a driver, a coupling sleeve screwable thereon and having a cylindrical and a conical portion and a ring-member mounted non-rotatably and coaxially with the coupling sleeve, a checking or retarding device, comprising a split resilient ring seated in a peripheral groove of the cylindrical portion of the coupling sleeve and inherently expansible into contact with the non-rotatable ring member, and means projecting from said resilient ring and adapted to engage the conical coupling face of the hub shell during drive and to compress said resilient ring and withdraw it from the non-rotatable ring member.

FRANZ WINKLER.